Aug. 20, 1929.  J. H. LOCK  1,725,151
MECHANICAL GEAR SHIFT FOR AUTOMOBILES
Filed Dec. 28, 1928  2 Sheets-Sheet 2
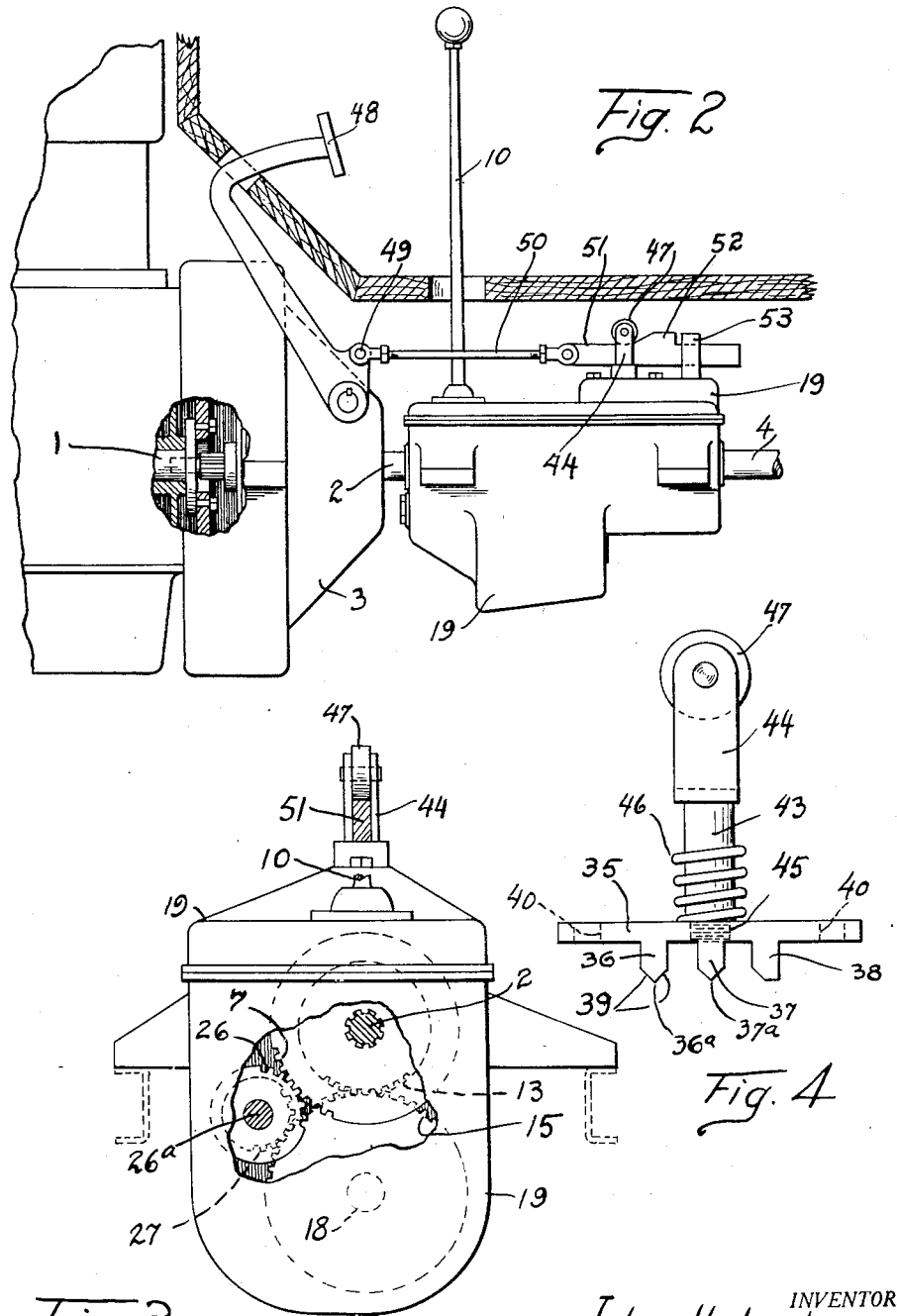
INVENTOR.
John H. Lock
BY Stuart C. Barnes
ATTORNEY.

Patented Aug. 20, 1929.

1,725,151

UNITED STATES PATENT OFFICE.

JOHN H. LOCK, OF HAZEL PARK, MICHIGAN.

MECHANICAL GEAR SHIFT FOR AUTOMOBILES.

Application filed December 28, 1928. Serial No. 328,936.

This invention relates to improvements in mechanical gear shifts for automobiles.

More particularly it is the object of this invention to present a mechanism wherein the shifting of gears will be automatically effected and controlled by the car speed when the clutch pedal is released.

It is recognized that such mechanical gear shift mechanisms are not broadly new but, among other things, it is the object of this invention to present a mechanical gear shift of such a nature that the gears will be automatically prevented from shifting unless the requisite car speed has been attained.

In the drawings:

Fig. 2 is a side elevation showing the gear shift mechanism operatively connected to the clutch pedal.

Fig. 3 is a front end view of the gear shift mechanism with the casing partly broken away to show the reverse gears in operative position.

Fig. 4 is a detailed view of the gear shift locking device.

Figure 1:
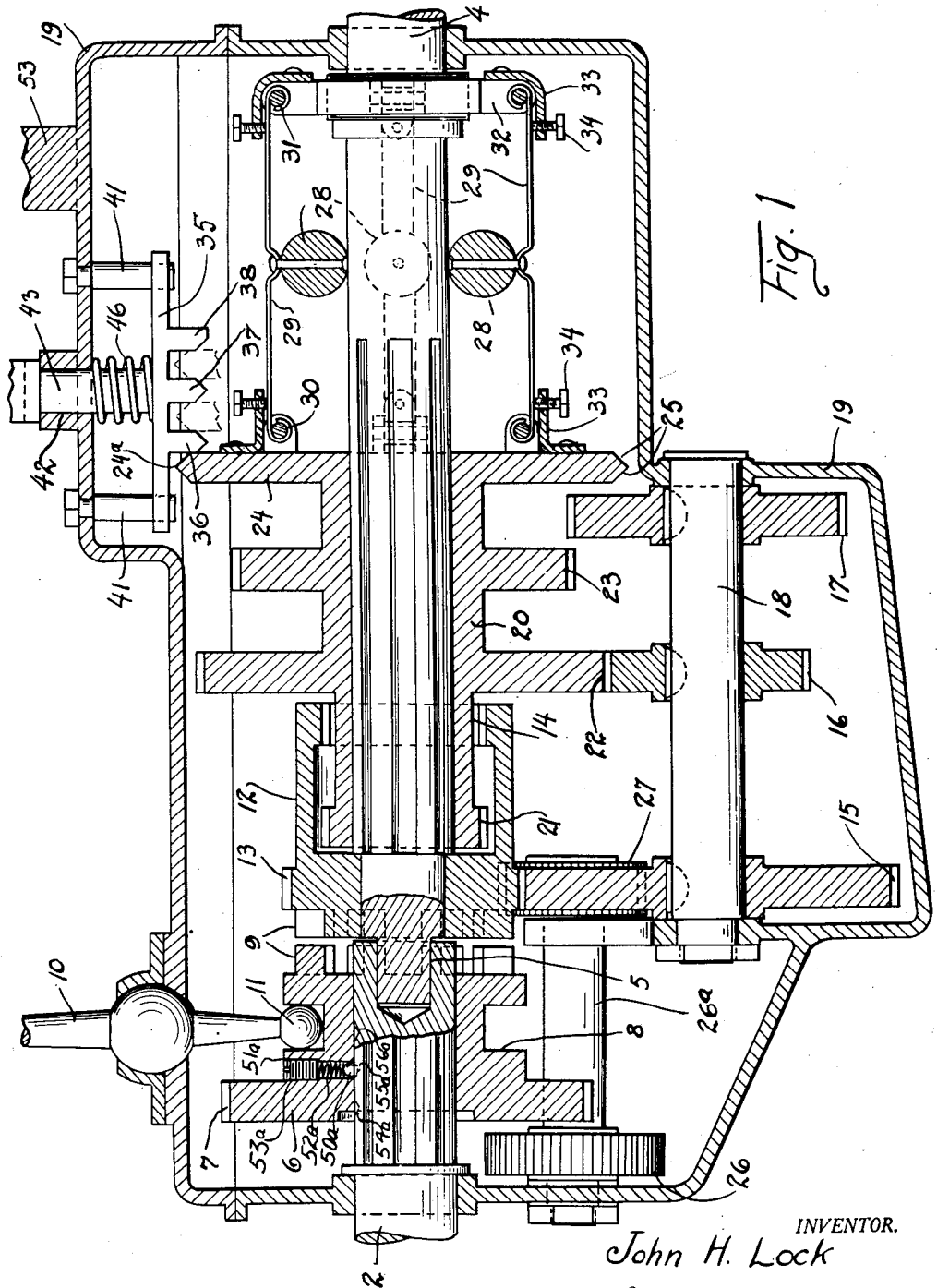
Fig. 1 is a longitudinal section through the transmission showing the relative position of the various parts when the gears are in neutral position.

Referring more particularly to the drawings, first the various parts of the mechanism will be described and their relative positions defined, and then the operation of the device will be explained. The driving shaft may be designated 1. The driven shaft consists of the part 2 which is operatively connected to the driving shaft 1 by means of a clutch which may be generally designated 3 and of the part 4 which is journaled into the part 2 as at 5.

The gear sleeve 6 which has the circumferential groove 8, is splined on the driven shaft 2 and carries the circumferential external gear 7, and the dogs 9. The gear shift lever 10 is adapted to move the gear sleeve 6 backwardly and forwardly by means of the end portion 11 which cooperates with the circumferential groove 8. The gear sleeve is removably held in neutral, forward, or reverse position by means of the ball bearing 50ª which is resiliently held in the threaded opening 51ª in the gear sleeve 6 by the spring 52ª and plug 53ª, and which ball bearing is adapted to resiliently engage the sockets 54ª, 55ª, and 56ª in the shaft 2 when the gear sleeve is respectively in reverse, neutral, or forward position.

Fixed on to the driven shaft 4 is the gear sleeve 12 which consists of the dogs 9, the external gear 13, and the internal gear 14.

The free running gears 15, 16, and 17 are fixed to the shaft 18 which is rotatively mounted in the transmission casing 19.

Splined on to the driven shaft 4 is another gear sleeve 20 which consists of the external gears 21, 22, 23, and the annulus 24 which has the beveled faces 25. The gear 21 is adapted to be inclosed by the gear sleeve 12.

The reverse idler gear 26 is mounted to the side of the gear 7 at one end of the shaft 26ª as shown in Fig. 3. Mounted at the opposite end of the shaft 26ª and permanently meshed with gear 15 is the idler reverse gear 27.

The shifting mechanism is operated by centrifugal force and consists of the weights 28 which are fixed to the springs 29. The springs 29 are fixed at one end to the lugs 30 on the annulus 24, and at the other end are fixed to the lugs 31 of the support 32 which is fixed to the driven shaft 4. For the purpose of tightening the springs 29, the annulus 24 and the support 32 have attached thereto the stiff L-springs 33. The L-springs have threaded apertures adapted to receive the adjusting bolts 34. These bolts may be turned in order to tighten or loosen the springs 29.

The locking device for the shifting mechanism consists of the cross piece 35 which carries the downwardly projecting locking arms 36, 37, and 38 which have V-shaped ends as at 39. The cross piece 35 at each end has the apertures 40 which are adapted to slidably engage the guides 41 which are mounted upon the inside of transmission casing 19. Journaled into the gear shift casing as at 42 and in slidable relation thereto is the lock bar support 43 which is enlarged and bifurcated at one end 44 and which threadedly engages the cross piece 35 as at 45. Mounted about the lock bar support between the cross piece 35 and the transmission casing 19 is the spring 46 which resists any upward movement of the cross piece 35.

Rotatively mounted between the bifurcated portion of the support 43 is the roller 47. Pivotally connected to the clutch pedal 48 as at 49 is a longitudinal bar 50 which pivotally connects with a slide 51 having a cam portion 52. The slide 51 is slidably mounted in the bifurcated end 44 of the bar 43 and slidably mounted in the guide 53 which is fixed to the transmission casing 19.

As shown in Fig. 1, the gears are in neutral position and it will be noticed that the gear shift lever 10 is in a vertical position.

Starting from neutral, the operation of the mechanism is as follows: The operator presses in the clutch pedal and throws the gear shift lever 10 forward thereby causing the dogs 9 to engage. The operator then releases the clutch pedal, and lets in the clutch. The gears are now in low, and the power is being transmitted through the driven shaft 2, the dogs 9, gears 13 and 15, shaft 18, gears 16 and 22 to the driven shaft 4 which is connected with the rear wheels in the usual manner.

The car is now propelled forward until the requisite shifting speed is obtained since the shifting of gears is automatically controlled by the car speed. The operator again throws in the clutch pedal causing the cam 52 to engage the roller 47 which in turn raises the lock bar support 43, the cross piece 35 and the lock bars 36, 37, and 39. The centrifugal force causes the weights 28 to be thrown outwardly which exerts a pull upon the gear sleeve 20. Since the lock bar 36 has been raised by throwing in the clutch pedal, the gear sleeve 20 is pulled to the right. If the speed of the car is not great enough so that the edge 24ª of annulus 24 is pulled to the right of edge 36ª of lock bar 36, then when the clutch pedal is again released, the cam engagement of the face 39 of lock bar 36 and the face 25 of annulus 24 will cause the gear sleeve 20 to slide to the left and again resume the position shown in Fig. 1. But assuming that the car speed is sufficient to allow a shift into second gear, the pull exerted by the weights 28 through the springs 29 upon the gear sleeve 20 will cause the gear sleeve 20 to move to the right and the annulus 24 to be engaged between the lock bars 36 and 37. The gears are now in second and the power is transmitted through the driven shaft 2, dogs 9, gears 13 and 15, shaft 18, and gears 17 and 23 to the driven shaft 4.

When the car has again attained sufficient speed, the clutch pedal is again thrown in and the action of the weights 28 again causes the gear sleeve 20 to move to the right since, as described above, the locking device has again been raised by throwing in the clutch pedal. If the car speed is sufficient when the clutch pedal is released, the gear sleeve 20 is moved to the right and the annulus 24 is engaged between the lock bars 37 and 38. Upon the release of the clutch pedal, if the car speed is not sufficient to move edge 24ª to the right of edge 37ª of lock bar 37, then, in like manner as stated above, the gear sleeve 20 will be moved to the left by the cam action of lock bar 37 and beveled sides 25 of the annulus 24 and shifting into high thereby prevented. The gears are now in high. In this position the power is transmitted through driven shaft 2, dogs 9, the internal gear 14 and the gear 21 which is now in mesh with the gear 14 owing to the movement to the right of the gear sleeve 20, and thence to the driven shaft 4.

To shift downward, the reverse of the above operation takes place. The clutch pedal is thrown in, causing the lock device to be raised, then as the car speed sufficiently decreases, the governor weights 28 through the spring 29 will tend to throw the gear sleeve 20 to the left and thereby automatically shift the gears into second or low, depending upon the car speed. If the car speed has not decreased sufficiently so that the edge 24ª of the annulus is moved to the left of the edge 37ª of the lock arm 37 by means of the centrifugally operated weights 28, then when the clutch pedal is let in, the beveled edge of the lock arm 37 will engage the beveled edge 25 of the annulus with a cam action and retain the gears in high. A similar cam action between the beveled face 39 of the lock arm 36 and the beveled face 25 of the annulus 24 will take place to prevent the gears from being shifted into low if the car speed has not yet sufficiently decreased to permit shifting of the gears into low.

To reverse the gears, assuming the gears are in neutral as shown in Fig. 1, the operation is as follows: The gear shift lever 10 is drawn backward by the operator, thereby causing the gear sleeve 6 to move to the left which causes the gears 7 and 26 to mesh. Since the idler gear 27 and the gear 15 are continuously in mesh, the power is transmitted through driven shaft 2, gears 7—26—27—15, shaft 18, gears 16 and 22, and thence to the driven shaft 4.

It is evident from the above description that I have presented an automatic gear shift mechanism which obviates the necessity of using the gear shift lever in order to shift into second and high speeds, and which has a locking device which automatically prevents the gears from being shifted either up or down till the proper car speed has been attained.

What I claim is:

1. In a motor vehicle, the combination of transmission gear sleeves shiftable to vary the speed of the vehicle, one of said gear sleeves having an annulus, centrifugally controlled means for shifting the forward speed gears, and means under the control of the operator for allowing said centrifugally controlled means to operate, said means including a plurality of lock bars adapted to removably engage said annulus.

2. In a motor vehicle, the combination of transmission gear sleeves shiftable to vary the speed of the vehicle, one of said gear sleeves having a beveled annulus, centrifugally operated means for shifting the forward speed gears, and means under the control of the operator for allowing said centrifugally operated means to operate, the said means including a plurality of beveled lock bars, the beveled portions of said lock bars adapted to slidably engage the beveled portion of said annulus.

3. In a motor vehicle, the combination of transmission gear sleeves shiftable to vary the speed of the vehicle, one of said gear sleeves having a beveled annulus, centrifugally operated means for shifting the forward speed gear sleeves when the vehicle has attained the requisite speed, means under the control of the operator for allowing said centrifugally operated means to operate, said means including a plurality of beveled lock bars adapted for upward and downward movement and resilient means for resisting the upward movement of said lock bar, the beveled portions of said lock bars adapted to slidably engage the beveled portion of said annulus to prevent a shifting of gears until the requisite car speed has been attained.

In testimony whereof I have affixed my signature.

JOHN H. LOCK.